(12) United States Patent
Kim et al.

(10) Patent No.: US 11,710,498 B2
(45) Date of Patent: Jul. 25, 2023

(54) ELECTRONIC DEVICE AND CONTROL METHOD THEREFOR

(71) Applicant: SAMSUNG ELECTRONICS CO., LTD., Suwon-si (KR)

(72) Inventors: Gahye Kim, Suwon-si (KR); Jihyeok Kim, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 17/423,024

(22) PCT Filed: Nov. 26, 2019

(86) PCT No.: PCT/KR2019/016377
§ 371 (c)(1),
(2) Date: Jul. 14, 2021

(87) PCT Pub. No.: WO2020/166796
PCT Pub. Date: Aug. 20, 2020

(65) Prior Publication Data
US 2022/0084540 A1    Mar. 17, 2022

(30) Foreign Application Priority Data
Feb. 11, 2019 (KR) .................. 10-2019-0015605

(51) Int. Cl.
*G10L 25/51* (2013.01)
*G10L 19/018* (2013.01)

(52) U.S. Cl.
CPC ............ *G10L 25/51* (2013.01); *G10L 19/018* (2013.01)

(58) Field of Classification Search
CPC ....... G10L 25/51; G10L 19/018; G10L 15/22; G06F 3/167; G06F 1/1605; G06F 1/1643;
(Continued)

(56) References Cited

U.S. PATENT DOCUMENTS

| 5,548,681 | A | 8/1996 | Gleaves et al. |
| 8,340,975 | B1 | 12/2012 | Rosenberger |
| 9,444,423 | B2 | 9/2016 | Kim et al. |
| 9,576,591 | B2 | 2/2017 | Kim |
| 9,691,378 | B1 | 6/2017 | Meyers et al. |
| 10,685,652 | B1 * | 6/2020 | Cherukuri ............... G10L 25/51 |

(Continued)

FOREIGN PATENT DOCUMENTS

| EP | 2830044 A1 | 1/2015 |
| JP | 2010164992 A | 7/2010 |

(Continued)

OTHER PUBLICATIONS

Method and System for Dynamically Creating Shared Trigger Phrases in Multi-AI, Passive-Listening Voice-Assistance Systems (Year: 2022).*

(Continued)

*Primary Examiner* — Mohammad K Islam
(74) *Attorney, Agent, or Firm* — Sughrue Mion, PLLC

(57) ABSTRACT

An electronic apparatus is provided. The electronic apparatus includes a communication interface and a processor configured to, based on receiving a first audio signal from a first sensor device from among a plurality of sensor devices through the communication interface, perform an operation corresponding to the first audio signal, and control the first sensor device to output a second audio signal indicating a result of performing the operation corresponding to the first audio signal, and based on receiving a third audio signal from a second sensor device from among the plurality of sensor devices within a threshold time from a time of controlling the first sensor device through the communication interface, determine whether to process the third audio signal based on the second audio signal and the third audio signal. In particular, at least part of a method of determining whether to process the third audio signal may use an artificial intelligence model that is trained according to at least one of a neural network or a deep learning algorithm.

15 Claims, 11 Drawing Sheets

(58) Field of Classification Search
CPC .. G06F 3/0412; H04M 1/72533; H04R 1/083; H04R 27/00
See application file for complete search history.

(56) References Cited

U.S. PATENT DOCUMENTS

| | | | |
|---|---|---|---|
| 2003/0018479 A1 | 1/2003 | Oh et al. | |
| 2014/0095177 A1 | 4/2014 | Kim | |
| 2016/0196630 A1 | 7/2016 | Blesser | |
| 2016/0358614 A1 | 12/2016 | Phielipp | |
| 2017/0025124 A1* | 1/2017 | Mixter | G10L 15/32 |
| 2017/0046124 A1 | 2/2017 | Nostrant | |
| 2018/0096693 A1 | 4/2018 | Gautama | |
| 2018/0336892 A1 | 11/2018 | Kim et al. | |
| 2019/0362715 A1* | 11/2019 | Aggarwal | G06F 3/1423 |
| 2019/0378518 A1 | 12/2019 | Jeong et al. | |
| 2021/0026593 A1* | 1/2021 | Wang | G10L 15/1822 |

FOREIGN PATENT DOCUMENTS

| | | |
|---|---|---|
| JP | 2014-32364 A | 2/2014 |
| KR | 2003-0008726 A | 1/2003 |
| KR | 100651940 B1 | 12/2006 |
| KR | 10-2014-0038179 A | 3/2014 |
| KR | 1020140042273 A | 4/2014 |
| KR | 1020170135133 A | 12/2017 |
| KR | 10-1883301 B1 | 7/2018 |
| KR | 10-2018-0133523 A | 12/2018 |
| WO | 2016/085776 A1 | 6/2016 |
| WO | 2017/078926 A1 | 5/2017 |

OTHER PUBLICATIONS

Voice Commands Coordination Between the Same App On Multiple Devices (Year: 2017).*
International Search Report (PCT/ISA/210) issued by the International Searching Authority in International Application No. PCT/KR2019/016377, dated Mar. 18, 2020.
Written Opinion (PCT/ISA/237) issued by the International Searching Authority in International Application No. PCT/KR2019/016377, dated Mar. 18, 2020.
Communication dated Nov. 19, 2021 issued by the European Patent Office in EP Application No. 19915473.3.

* cited by examiner

FIG. 4

|  | Dot 1 & Dot 2 | Dot 1 & Dot 3 | Dot 2 & Dot 3 |
|---|---|---|---|
| RETURN AUDIO SIGNAL RECEIVING TIME | 0.1s | 1s | 0.15s |
| RETURN AUDIO SIGNAL RECEIVING PROBABILITY | 99% | 80% | 92% |

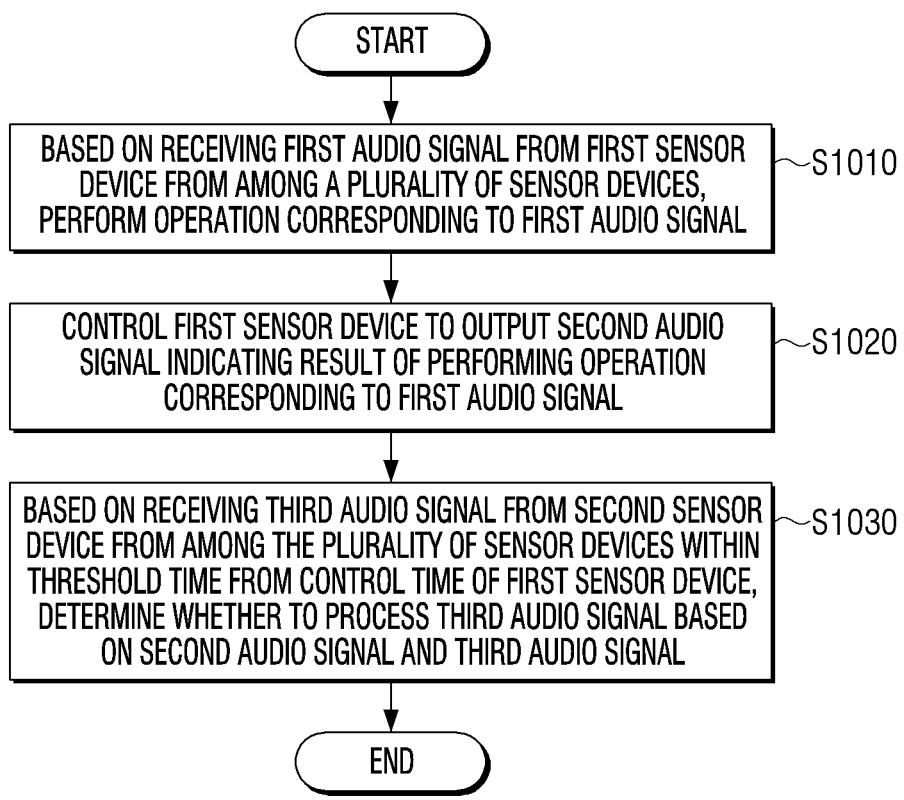

ELECTRONIC DEVICE AND CONTROL METHOD THEREFOR

TECHNICAL FIELD

This disclosure relates to an electronic apparatus and a controlling method thereof and more particularly, to an electronic apparatus that performs voice recognition and a controlling method thereof.

In addition, the present disclosure relates to an artificial intelligence (AI) system that simulates functions of a human brain such as cognition, determination, etc. using a machine learning algorithm and an application thereof.

BACKGROUND ART

Recently, artificial intelligence systems are being used in various fields. An artificial intelligence system is a system wherein a machine learns, determines, and becomes smarter by itself, unlike conventional rule-based smart systems. An artificial intelligence system shows a more improved recognition rate as it is used more, and becomes capable of understanding user preference more accurately. For this reason, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data by itself, and an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

Recently, electronic apparatuses that recognize a user voice and operate accordingly, such as an AI speaker, have been developed, but placing such electronic apparatuses in all spaces such as living room, kitchen and bed room may be costly.

Thus, a method of using a main (edge) apparatus that processes the user voice and a plurality of sub (dot) apparatuses that receive the user voice and provide the user voice to the main apparatus. The plurality of sub apparatuses may be placed in spaces such as living room, kitchen and bed room.

In this case, the main apparatus may control the sub apparatuses in order to provide a guidance audio signal to the user. However, the guidance audio signal output from a sub apparatus may be received by another sub apparatus to be transmitted to the main apparatus. Here, the main apparatus has a problem of processing the guidance audio signal received from the another sub apparatus. In other words, there is a problem in that the guidance audio signal that does not require processing, other than a user voice or a control command, is processed.

DISCLOSURE

Technical Problem

The disclosure has been made to solve the above-described problem, and an object of the disclosure is to provide an electronic apparatus that performs voice recognition regarding a valid audio signal from among received audio signals and a controlling method thereof.

Technical Solution

According to an embodiment, an electronic apparatus includes a communication interface and a processor configured to, based on receiving a first audio signal from a first sensor device from among a plurality of sensor devices through the communication interface, perform an operation corresponding to the first audio signal, based on receiving a first audio signal from a first sensor device from among a plurality of sensor devices through the communication interface, perform an operation corresponding to the first audio signal, control the first sensor device to output a second audio signal indicating a result of performing the operation corresponding to the first audio signal, and based on receiving a third audio signal from a second sensor device from among the plurality of sensor devices within a threshold time from a time of controlling the first sensor device through the communication interface, determine whether to process the third audio signal based on the second audio signal and the third audio signal.

The processor may obtain a similarity between the second audio signal and the third audio signal, and based on the similarity being equal to or greater than a threshold value, may not process the third audio signal.

The apparatus may further include a memory, and the processor may be configured to, based on the similarity being less than the threshold value, process a fourth audio signal where the second audio signal is removed from the third audio signal or process the third audio signal based on an operation history of the first sensor device and the second sensor device stored in the memory.

The operation history may include at least one of information on a similarity between an audio signal transmitted to one of the plurality of sensor devices and an audio signal received from another one of the plurality of sensor devices or a time difference between a control time of one of the plurality of sensor devices and a time of receiving an audio signal from another one of the plurality of sensor devices.

The processor may control the first sensor device to output the second audio signal and a watermark, and based on the third audio signal including the watermark, may not process the third audio signal.

The processor may be configured to control the first sensor device to output as at least one of low frequency, high frequency or inaudible sound.

The apparatus may further include a memory, and the processor may be configured to obtain the threshold time based on an operation history of the first sensor device and the second sensor device stored in the memory.

The processor may be configured to update the threshold time based on at least one of a signal intensity of the first audio signal or a signal intensity of the third audio signal.

The processor may be configured to determine whether to perform voice recognition of the third audio signal based on the second audio signal and the third audio signal.

The processor may be configured to, based on receiving the third audio signal after the threshold time from the control time of the first sensor device through the communication interface, process the third audio signal.

According to an embodiment, a controlling method of an electronic apparatus may include, based on receiving a first audio signal from a first sensor device from among a plurality of sensor devices, performing an operation corresponding to the first audio signal, controlling the first sensor device to output a second audio signal indicating a result of performing the operation corresponding to the first audio signal, and based on receiving a third audio signal from a second sensor device from among the plurality of sensor devices within a threshold time from a time of controlling the first sensor device, determining whether to process the third audio signal based on the second audio signal and the third audio signal.

The determining may include obtaining a similarity between the second audio signal and the third audio signal, and based on the similarity being equal to or greater than a threshold value, not processing the third audio signal.

The determining may include, based on the similarity being less than the threshold value, processing a fourth audio signal where the second audio signal is removed from the third audio signal or processing the third audio signal based on an operation history of the first sensor device and the second sensor device stored in the electronic apparatus.

The operation history may include at least one of information on a similarity between an audio signal transmitted to one of the plurality of sensor devices and an audio signal received from another one of the plurality of sensor devices or a time difference between a control time of one of the plurality of sensor devices and a time of receiving an audio signal from another one of the plurality of sensor devices.

The controlling may include controlling the first sensor device to output the second audio signal and a watermark, and the determining may include, based on the third audio signal including the watermark, not processing the third audio signal.

The controlling may include controlling the first sensor device to output as at least one of low frequency, high frequency or inaudible sound.

The method may further include obtaining the threshold time based on an operation history of the first sensor device and the second sensor device stored in the memory.

The method may further include updating the threshold time based on at least one of a signal intensity of the first audio signal or a signal intensity of the third audio signal.

The determining may further include determining whether to perform voice recognition of the third audio signal based on the second audio signal and the third audio signal.

The determining may further include, based on receiving the third audio signal after the threshold time from the control time of the first sensor device through the communication interface, processing the third audio signal.

Effects

According to various embodiments of the present disclosure, an electronic apparatus may determine whether to perform processing after removing an audio signal output by a sensor device from among received audio signals and thus, may avoid unnecessary audio processing and overlapping processing.

DESCRIPTION OF DRAWINGS

FIGS. 3 and 4 are views provided to explain an operation of an electronic apparatus according to an embodiment;

FIG. 10 is a flowchart provided to explain a controlling method of an electronic apparatus according to an embodiment.

BEST MODE FOR CARRYING OUT THE INVENTION

Mode for Carrying Out the Invention

Figure 1:
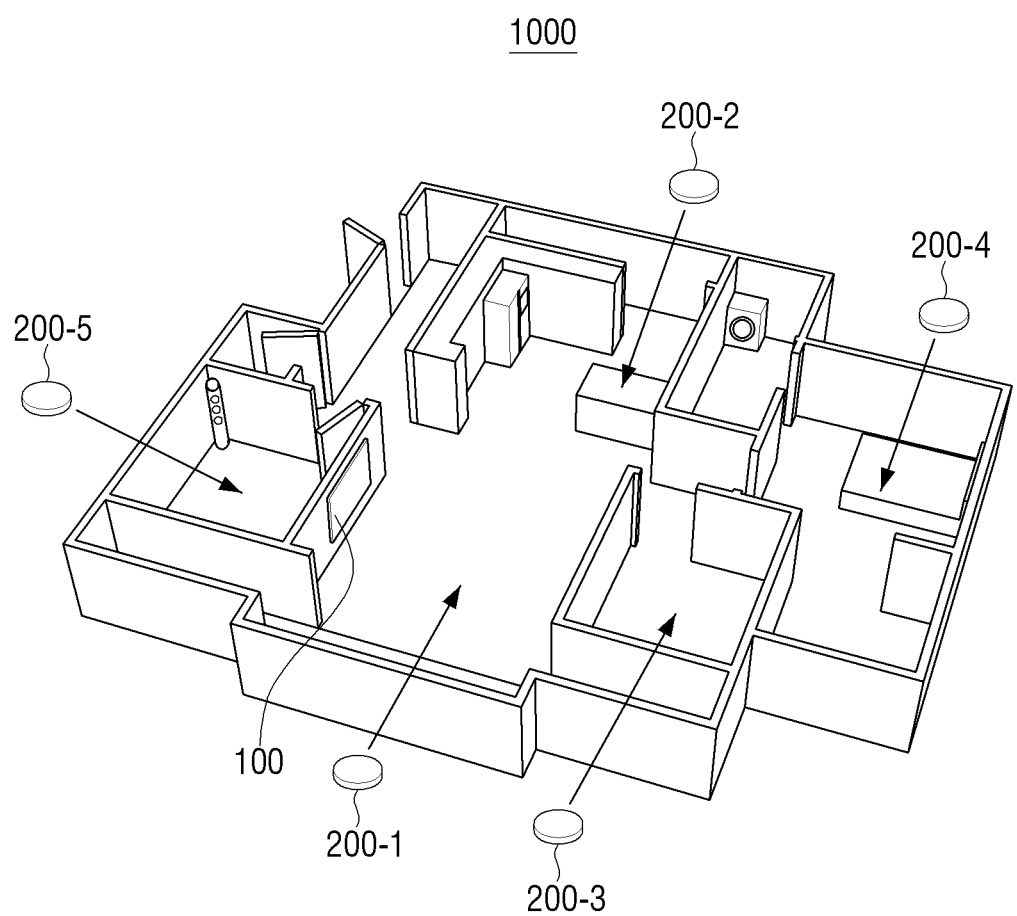
FIG. 1 is a view illustrating an electronic system according to an embodiment.

Hereinafter, the present disclosure will be described in detail with reference to accompanying drawings.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates an existence of a corresponding feature (for example, a numerical value, a function, an operation, a component such as a part, or the like), and does not exclude an existence of an additional feature.

Expressions such as "A or/and B" should be understood to mean one of "A","B" or "A and B."

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is "(operatively or communicatively) coupled with/to" or is "connected to" another component (e.g., a second component), it is to be understood that any component is directly coupled with/to another component or may be coupled with/to another component through the other component (e.g., a third component).

Singular forms used herein are intended to include plural forms unless explicitly indicated otherwise. It is to be understood that terms 'comprise' or 'include' used in the specification, specify the presence of features, numerals, steps, operations, components, parts mentioned in the present specification or combinations thereof, but do not preclude the presence or addition of one or more other features, numerals, steps, operations, components, parts or combinations thereof.

In the description, the word "module" or "unit" refers to a software component, a hardware component, or a combination thereof, which is capable of carrying out at least one function or operation. A plurality of modules or units may be integrated into at least one module and realized using at least one processor (not shown) except for those modules or units that need to be realized in specific hardware.

In the disclosure, a term "user" may refer to a person using an electronic apparatus or an apparatus (for example, an artificial intelligence electronic apparatus) using an electronic apparatus.

Hereinafter, an embodiment of the present disclosure will be described in greater detail with reference to accompanying drawings.

FIG. 1 is a view illustrating an electronic system 1000 according to an embodiment.

As illustrated in FIG. 1, the electronic system 1000 includes an electronic apparatus 100 and a plurality of sensor devices 200-1-200-5. Here, the electronic apparatus 100 may be referred to as an edge device or a hub device, and the sensor devices may be referred to as dot devices.

The electronic apparatus 100 according to various embodiments may include at least one of, for example, speakers, smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to an embodiment, the electronic apparatus may include at least one of, for example, televisions (TVs), digital versatile disc (DVD) players, audios, refrigerators, air-conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

In FIG. 1, the electronic apparatus 100 is implemented as a TV for convenience of explanation, but the electronic apparatus 100 may be implemented as other devices. For example, one of a refrigerator, a washing machine or a speaker may operate as the electronic apparatus 100.

The electronic apparatus 100 may receive a first audio signal from one of the plurality of sensor devices 200-1-200-5. For example, the electronic apparatus 100 may receive the first audio signal of 'lower the refrigerator temperature' from the first sensor device 200-1 placed in the living room. In this case, the electronic apparatus 100 may transmit a control command for decreasing the refrigerator temperature to the refrigerator. Here, the plurality of sensor devices 200-1-200-5 may be devices that receive surrounding audio and transmit audio signals to the electronic apparatus 100. In addition, the electronic system 1000 may further include other electronic apparatuses such as a refrigerator other than the electronic apparatus 100 and the plurality of sensor devices 200-1-200-5. Other electronic apparatuses may be devices which are controlled by the electronic apparatus 100 and may communicate with the electronic apparatus 100.

The electronic apparatus 100 may control one of the plurality of sensor devices 200-1-200-5 to output a second audio signal which indicates a result of performing an operation corresponding to the first audio signal. In the above-described example, the electronic apparatus 100 may transmit a control command for lowering the refrigerator temperature to the refrigerator and the, transmit the second audio signal of 'the refrigerator temperature has been lowered' to one of the plurality of sensor devices 200-1-200-5. One of the plurality of sensor devices 200-1-200-5 may output the second audio signal. Here, one of the plurality of sensor devices 200-1-200-5 may be a sensor device that has received the first audio signal and transmitted the received first audio signal to the electronic apparatus 100.

However, the present disclosure is not limited to the above embodiment, and the electronic apparatus 100 may transmit the second audio signal to another sensor device which is not the sensor device that has transmitted the first audio signal. For example, the electronic apparatus 100 may receive the first audio signal of 'lower the refrigerator temperature' from the first sensor device 200-1 placed in the living room and then, if a user is in the kitchen at a time when the second audio signal is to be transmitted, may transmit the second audio signal to the second sensor device 200-2 placed in the kitchen.

Subsequently, when receiving a third audio signal from another one of the plurality of sensor devices within a threshold time from a control time of one of the plurality of sensor devices 200-1-200-5, the electronic apparatus 100 may determine whether to process the third audio signal based on the second audio signal and the third audio signal.

For example, the electronic apparatus 100 may receive the third audio signal from the second sensor device 200-2 within 0.1 seconds from the control time of the first sensor device 200-1. Here, the third audio signal may be the audio signal that is transmitted to the electronic apparatus 100 after the second sensor 200-2 receives the second audio signal output by the first sensor device 200-1. In this case, the second audio signal input to the second sensor device 200-2 is merely a signal indicating a result of performing an operation and thus, the third audio signal which is not a user's voice command may be an audio signal that does not need to be processed. This is a phenomenon that may occur when the first sensor device 200-1 and the second sensor device 200-2 are disposed in adjacent to each other.

In another example, the electronic apparatus 100 may receive the third audio signal from the fourth sensor device 200-4 five seconds after the control time of the first sensor device 200-1. In this case, the fourth sensor device 200-4 may be spaced apart from the first sensor device 200-1, and as there is a difference in the time of receiving an audio signal, the electronic apparatus 100 may process the third audio signal.

As described above, the electronic apparatus 100 may determine whether to process the third audio signal by comparing the second audio signal and the third audio signal.

Each of the plurality of sensor devices 200-1-200-5 may receive a user voice or other sound. In particular, when receiving a user voice, each of the plurality of sensor devices 200-1-200-5 may transmit an audio signal corresponding to the received user voice to the electronic apparatus 100.

In addition, each of the plurality of sensor devices 200-1-200-5 may operate in a standby mode state before being woken up based on sensing a user, etc. and transmit to the electronic apparatus 100 an audio signal corresponding to a user voice that is input after sensing the user.

However, the present disclosure is not limited to the above embodiment, and each of the plurality of sensor devices 200-1-200-5 may be woken up based on receiving a trigger word, and transmit an audio signal corresponding to a user voice that is received after being woken up, to the electronic apparatus 100.

Through the above-described operations, it is possible to minimize power consumption by each of the plurality of sensor devices 200-1-200-5 and prevent an unnecessary audio signal from being transmitted to the electronic apparatus 100.

Based on receiving the second audio signal indicating a result of performing an operation from the electronic apparatus 100, each of the plurality of sensor devices 200-1-200-5 may output the second audio signal.

Figure 2A:
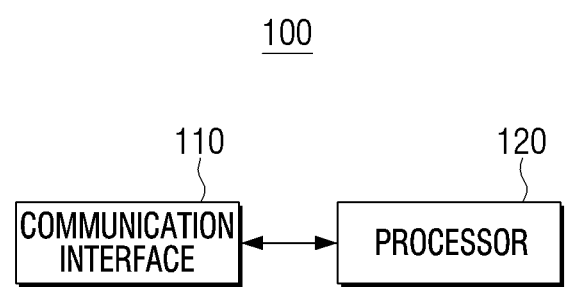
FIG. 2A is a block diagram illustrating an example of configuration of an electronic apparatus.

FIG. 2A is a block diagram illustrating an example of configuration of the electronic apparatus 100.

Referring to FIG. 2A, the electronic apparatus 100 includes a communication interface 110 and a processor 120.

The communication interface 110 is configured to perform communication with various devices. For example, the communication interface 110 may support various communication interfaces such as BlueTooth (BT), Bluetooth Low Energy (BLE), Wireless Fidelity (Wi-Fi), Zigbee, and the like. However, the communication interface 110 is not limited thereto, and may be any communication interface capable of performing wireless communication.

In addition, the communication interface 110 may include an input/output interface capable of performing wired communication with various devices. For example, the communication interface 110 may include an input/output interface such as HDMI, MHL, USB, RGB, D-SUB, DVI, and the like, and may perform communication with various devices.

However, the communication interface 110 is not limited thereto, and the input/output interface may be any interface with a standard capable of transmitting/receiving data.

The electronic apparatus 100 may be connected to the plurality of sensor devices 200-1-200-5 and transmit/receive an audio signal. In addition, the electronic apparatus 100 may be connected to anther electronic apparatus to transmit/receive an audio signal. In addition, the electronic apparatus 100 may be connected to another electronic apparatus and transmit a control command corresponding to the audio signal received from the sensor device to another electronic apparatus.

The communication interface 110 may include an interface with a communication standard capable of performing wired/wireless communication with various devices other than the interface described above.

The processor 120 controls the overall operations of the electronic apparatus 100.

The processor 120 may be implemented by a digital signal processor (DSP) processing a digital signal, a microprocessor, or a time controller (TCON). However, the processor 120 is not limited thereto, but may include one or more of a central processing unit (CPU), a micro controller unit (MCU), a micro processing unit (MPU), a controller, an application processor (AP), a graphics-processing unit (GPU) or a communication processor (CP), or an ARM processor, or may be defined by these terms.

In addition, the processor 120 may be implemented by a system-on-chip (SoC) or a large scale integration (LSI) in which a processing algorithm is embedded or may be implemented in a field programmable gate array (FPGA) form. The processor 120 may perform various functions by executing computer executable instructions stored in a memory.

When receiving the first audio signal from the first sensor device from among a plurality of sensor devices through the communication interface 110, the processor 120 may perform an operation corresponding to the first audio signal, and control the first sensor device to output the second audio signal indicating a result of performing the operation corresponding to the first audio signal.

For example, when receiving the first audio signal of 'turn on the air conditioner' from the first sensor device through the communication interface 110, the processor 120 may transmit a control signal for turning on the air conditioner to the air conditioner, and may transmit the second audio signal of 'the air conditioner has been turned on' to the first sensor device. Subsequently, the first sensor device may output the second audio signal of 'the air conditioner has been turned on.' In this case, the second audio signal of 'the air conditioner has been turned on' may be input to another sensor device adjacent to the first sensor device. Hereinafter, for convenience of explanation, it is described that the second sensor device is adjacent to the first sensor device and receives the second audio signal output from the first sensor device. The second sensor device transmits the third audio signal to the electronic apparatus 100 based on the input second audio signal.

When receiving the third audio signal from the second sensor device from among the plurality of sensor devices within a threshold time from the control time of the first sensor device through the communication interface 110, the processor 120 may determine whether to process the third audio signal based on the second audio signal and the third audio signal. Specifically, the processor 120 may obtain a similarity of the second audio signal and the third audio signal, and may not process the third audio signal if the similarity is equal to or greater than the similarity.

For example, when receiving the third audio signal from the second sensor device within 0.1 seconds from the control time of the first sensor device through the communication interface 110, the processor 120 may obtain a similarity of the second audio signal and the third audio signal, based on determining that the second audio signal and the third audio signal are similar, ignore the third audio signal, and based on determining that the second audio signal and the third audio signal are not similar, perform an operation corresponding to the third audio signal.

In the above example, based on receiving 'the air conditioner has been turned on' from the second sensor device within 0.1 seconds from the control time of the first sensor device through the communication interface 110, the processor 120 may ignore the received audio signal since the received signal is the same as the second audio signal transmitted to the first sensor device.

Here, the control time of the first sensor device may be a time when the processor 120 transmits the second audio signal to the first sensor device.

Meanwhile, the processor 120 may identify a similarity between the second audio signal and the third audio signal without performing voice recognition. For example, the processor 120 may obtain a time domain similarity between the second audio signal and the third audio signal, obtain a frequency domain similarity between the second audio signal and the third audio signal, and obtain a similarity between at least one of the time domain frequency or the frequency domain similarity. The processor 120 may identify whether the second audio signal and the third audio signal are the same by comparing the obtained similarity with a threshold similarity.

The processor 120 may obtain the time domain similarity between the second audio signal and the third audio signal through a cross-correlation, obtain the frequency domain similarity through a spectral coherence, and obtain the similarity based on at least one of the time domain similarity or the frequency domain similarity. The cross-correlation and the spectral coherence are well-known technologies and thus, detailed description thereof will not be provided.

In the above example, 0.1 seconds is given as an example of the threshold time, but this is only an example. Any values may be used as the threshold time.

Meanwhile, the electronic apparatus 100 may further include a memory, and based on the similarity being less than the threshold value, the processor 120 may process the fourth audio signal where the second audio signal is removed from the third audio signal or process the third audio signal based on an operation history of the first sensor device and the second sensor device stored in the memory.

Here, the operation history may include at least one of information on a similarity between an audio signal transmitted to one of the plurality of sensor devices and an audio signal received from another one of the plurality of sensor devices or a time difference between a control time of one of the plurality of sensor devices and a time of receiving an audio signal from another one of the plurality of sensor devices.

For example, if the memory stores only the time difference information, the processor 120 may control the first sensor device to output the second audio signal, and based on receiving the third audio signal from the second sensor device within a threshold time according to the time difference information from the control time of the first sensor device, may determine whether to process the third audio signal based on the similarity between the second audio signal and the third audio signal. Based on receiving the third audio signal after the threshold time, the processor 120 may process the third audio signal without identifying the similarity.

Here, if the time difference information is not stored, the processor 120 may use a predetermined threshold time. For example, the time difference information may include a first threshold time between the first sensor device and the second sensor device and information on a plurality of threshold times such as a second threshold time between the second sensor device and the third sensor device, etc. On the other hand, if there is no time difference information, the processor 120 may use one threshold time.

Meanwhile, the memory may store information regarding a similarity. For example, the memory may store an history in which the audio signal transmitted to the first sensor device and the audio signal received from the second sensor device are identified to be similar. In this case, the processor 120 may control the first sensor device to output the second audio signal, and based on receiving the third audio signal from the second sensor device within a threshold time according to the time difference information from the control time of the first sensor device, may determine whether to process the third audio signal based on the similarity between the second audio signal and the third audio signal. When identifying that the second audio signal and the third audio signal are similar, the processor 120 may not process the third audio signal. Alternatively, when identifying that the second audio signal and the third audio signal are not similar, the processor 120 may obtain the fourth audio signal where the second audio signal is received from the third audio signal and process the fourth audio signal. This may be the case in which the second sensor device has received the second audio signal output from the first sensor device, but an ambient noise or a user's additional voice is input simultaneously together with the second audio signal and thus, the similarity between the third audio signal transmitted by the second sensor device to the electronic apparatus 100 and the second audio signal becomes low.

For example, if the second audio signal 'the air conditioner has been turned on' is output from the first sensor device and at the same time, a user utters, 'what time is it now?', the second sensor device may transmit the third audio signal including the second audio signal and the user voice to the electronic apparatus 100. The processor 120 may identify that although the third audio signal is received within a threshold time from the time of controlling the first sensor device to output the second audio signal, the second audio signal is not similar to the third audio signal. However, the processor 120 may identify that the third audio signal includes the second audio signal according to a history of the audio signal output from the first sensor device being received through the second sensor device. The processor 120 obtains the fourth audio signal where the second audio signal is removed from the third audio signal, and processes the fourth audio signal.

Meanwhile, the processor 120 may control the first sensor device to output the second audio signal and a watermark, and if the third audio signal includes a watermark, the processor 120 may not process the third audio signal. Here, the processor 120 may control the first sensor device to output the watermark as at least one of low frequency, high frequency or inaudible sound. Accordingly, the user may not recognize the watermark, or the processor 120 may identify the watermark to determine whether to process the third audio signal.

Meanwhile, the processor 120 may obtain a threshold time based on an operation history of the first sensor device and the second sensor device stored in the memory.

In addition, the processor 120 may update the threshold time based on at least one of the signal intensity of the first audio signal or the signal intensity of the third audio signal. For example, the processor 120 may identify the distance between the electronic apparatus 100 and the first sensor device based on the signal intensity of the first audio signal, and update the threshold time based on the identified distance.

Meanwhile, the processor 120 may determine whether to process voice recognition regarding the third audio signal based on the second audio signal and the third audio signal. For example, if it is determined that the second audio signal and the third audio signal are not similar, the processor 120 may perform voice recognition regarding the third audio signal, and perform an operation based on a result of the voice recognition.

Figure 2B:
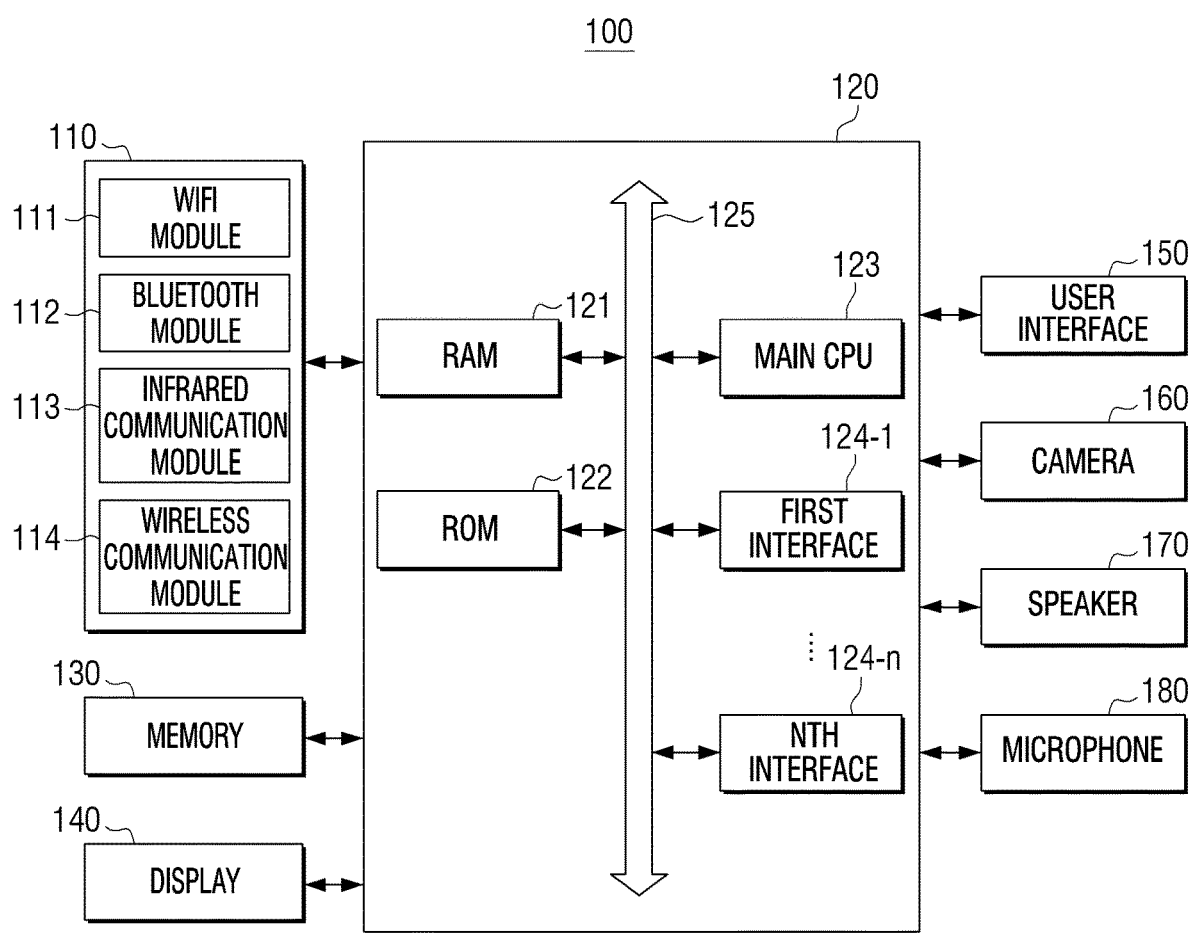
FIG. 2B is a block diagram illustrating an example of detailed configuration of an electronic apparatus.

FIG. 2B is a block diagram illustrating an example of detailed configuration of the electronic apparatus 100. The electronic apparatus 100 may include the communication interface 110 and the processor 120. In addition, referring to FIG. 2B, the electronic apparatus 100 may further include a memory 130, a display 140, a user interface 150, a camera 160, a speaker 170, and a microphone 180. Among the components illustrated in FIG. 2B, those overlapped with the components illustrated in FIG. 2A will not be described in detail.

The communication interface 110 is configured to perform communication with various types of external devices according to various types of communication methods. The communication interface 110 includes, a WiFi module 111, a Bluetooth module 112, an infrared communication module 113, a wireless communication module 114, and the lime. Here, each communication module may be implemented in the form of at least one hardware chip.

The processor 120 may perform communication with various external devices using the communication interface 110. Here, the external apparatuses may include a plurality of sensor devices, display devices such as a TV, image processing devices such as a set-top box, external servers, control devices such as a remote controller, audio output devices such as a Bluetooth speaker, lighting devices, home appliances such as a smart cleaner, a smart refrigerator, servers such as an IoT Home manager, etc.

The WiFi module 111 and the Bluetooth module 112 perform communication in a WiFi method and a Bluetooth method, respectively. In case of using the WiFi module 111 and the Bluetooth module 112, various connection information such as a service set identifier (SSID) and a session key may be first transmitted and received to establish communication connection, and then various information may be transmitted and received.

The infrared communication module 113 performs communication according to an infrared Data Association (IrDA) technology using infrared light which lies between visible light and millimeter waves for short-distance wireless data transmission.

The wireless communication module 114 may include at least one communication chip that performs communication according to various wireless communication standards such as Zigbee, 3rd generation (3G), 3rd generation partnership project (3GPP), long term evolution (LTE), LTE Advanced (LTE-A), 4th generation (4G), and 5 th generation (5G), other than the above-described communication methods.

In addition, the communication interface 110 may include at least one of a local area network (LAN) module, an Ethernet module, or a wired communication module performing communication by using a pair cable, a coaxial cable, an optical fiber cable, or the like.

The communication interface 110 may further include an input/output interface. The input/output interface may be one of High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), and Digital Visual Interface (DVI).

The input/output interface may input/output at least one of an audio signal or a video signal.

According to an embodiment, the input/output interface may include a port for inputting/outputting only an audio signal and a port for inputting/outputting only a video signal separately, or may be implemented as one port that inputs/outputs both an audio signal and a video signal.

The memory 130 may be implemented as an internal memory such as a read-only memory (ROM) (e.g., electrically erasable programmable read-only memory (EEPROM)), a random access memory (RAM) or the like, which is included in the processor 120, or may be implemented as a memory separate from the processor 120. In this case, the memory 130 may be implemented in a form of a memory embedded in the electronic apparatus 100 or a form of a memory attachable to and detachable from the electronic apparatus 100, depending on a data storing purpose. For example, data for driving the electronic device 100 may be stored in the memory embedded in the electronic device 100; and data for an extension function of the electronic device 100 may be stored in the memory attachable to and detachable from the electronic device 100. For example, data for driving the electronic apparatus 100 may be stored in the memory embedded in the electronic apparatus 100; and data for an extension function of the electronic apparatus 100 may be stored in the memory attachable to and detachable from the electronic apparatus 100. In case of being implemented as the memory embedded in the electronic apparatus 100, the memory may include at least one of a volatile memory (e.g., a dynamic random access memory (DRAM), a static RAM (SRAM), a synchronous dynamic RAM (SDRAM), etc.), a non-volatile memory (e.g., a one time programmable read-only memory (OTPROM), a programmable ROM (PROM), an erasable and programmable ROM (EPROM) and an electrically erasable and programmable ROM (EEPROM)), a mask ROM, a flash ROM, etc.), a flash memory (e.g., a NAND flash, a NOR flash, etc.), a hard drive, or a solid state drive (SSD)). In case of being implemented as the memory attachable to and detachable from the electronic apparatus 100, the memory 130 may include a memory card (e.g., a compact flash (CF), a secure digital (SD), a micro secure digital (Micro-SD), a mini secure digital (Mini-SD), an extreme digital (xD), a multi-media card (MMC), etc.), or an external memory (e.g., a universal serial bus (USB) memory) that can be connected to a USB port.

The memory 130 stores various data such as an Operating System (O/S) software module for driving the electronic apparatus 100, a history module, an audio processing module, a voice recognition module, etc.

The processor 120 controls the overall operations of the electronic apparatus 100 using various programs stored in the memory 130.

Specifically, the processor 120 includes a RAM 121, a ROM 122, a main CPU 123, first to nth interfaces 124-1 to 124-n, and a bus 125.

The RAM 121, the ROM 122, the main CPU 123, and the first to nth interfaces 124-1 to 124-n may be connected with one another through the bus 125.

The ROM 122 stores a set of instructions, etc. for system booting. When a turn-on instruction is input and power is supplied, the main CPU 123 copies the O/S stored in the memory 130 in the RAM 121 according to the instruction stored in the ROM 122, and boots the system by executing the O/S. When booting is completed, the main CPU 123 copies various types of application programs stored in the memory 130 in the RAM 121, and performs various types of operations by executing the application programs copied in the RAM 121.

The main CPU 123 accesses the memory 130, and performs booting by using the O/S stored in the memory 130. Then, the main CPU 123 performs various operations by using various programs, contents data, etc. stored in the memory 130.

The first to nth interfaces 124-1 to 124-n are connected with the aforementioned various components. One of the interfaces may be a network interface connected to an external apparatus through a network.

Meanwhile, the processor 120 may perform a graphic processing function (a video processing function). For example, the processor 120 may generate a screen including various objects such as an icon, an image, a text, etc. using a calculator (not illustrated) and a renderer (not illustrated). Here, the operator (not illustrated) may operate attribute values such as coordinate values, forms, sizes, and colors of each object to be represented according to a layout of the screen based on the received control instruction. The renderer (not illustrated) may generate screens of various layouts including the objects based on the attribute values which are operated by the operator (not illustrated). In addition, the processor 120 may perform various image processing such as decoding, scaling, noise filtering, frame rate conversion, resolution conversion, etc. with respect to video data Meanwhile, the processor 120 may perform various processing with respect to audio data. Specifically, the processor 120 may perform various processing such as decoding, amplification, noise filtering with respect to audio data.

The display 140 may be implemented as various types of displays such as Liquid Crystal Display (LCD), Organic Light Emitting Diodes (OLED) display, Plasma Display Panel (PDP), etc. The display 140 may further include a driving circuit, a backlight unit and the like, that may be implemented in a form such as a-si TFT, low temperature poly silicon (LTPS) TFT, an organic TFT (OTFT), and the like. Meanwhile, the display 140 may be implemented as a touch screen that is combined with a touch sensor, a flexible display, a 3D display, and the like.

The user interface 170 may be implemented as a device such as a button, a touch pad, a mouse or a keyboard, or may be implemented as a touch screen capable of performing the above-described display function and manipulation input function. Here, the button may be various types of buttons such as a mechanical button, a touch pad, a wheel, etc. which are formed on a certain area of the front, side, or rear of the external surface of the main body of the electronic apparatus 100.

The camera 160 is configured to photograph a still image or a moving image under the control of a user. The camera 160 may photograph a still image at a specific point in time, but may also photograph a still image continuously.

The speaker 170 may be configured to output not only various audio data processed by an input/output interface but also various notification sounds or voice messages.

The microphone 180 is configured to receive user voices or other sounds and convert the same into audio data.

The microphone may receive a user voice in an active state. For example, the microphone 180 may be formed to be integrated in the direction of the upper side, the front side, the lateral side, etc. of the electronic apparatus 100. The microphone 180 may include various components such as a microphone for collecting a user voice in an analog form, an amplifier circuit for amplifying the collected user voice, an A/D conversion circuit for sampling the amplified user voice and converting it into a digital signal, a filter circuit for removing a noise component from the converted digital signal, etc.

Meanwhile, the electronic apparatus 100 may receive an audio signal including a user voice from a sensor device including a microphone. In this case, the received audio signal may be a digital audio signal, but depending on embodiments, the received audio signal may be an analog audio signal. For example, the electronic apparatus 100 may receive an audio signal through a wireless communication method such as Bluetooth, WiFi, or the like.

The electronic apparatus 100 may perform voice recognition by directly applying an automatic speech recognition (ASR) technology to a digital voice signal received from a sensor device.

Alternatively, the electronic apparatus 100 may transmit the corresponding voice signal to an external server for voice recognition of a voice signal received from a sensor device.

In this case, the sensor device and a communication module for communication with the external server may be implemented as one or separately. For example, communication with the sensor device may be performed using a Bluetooth module, and communication with the external server may be performed using an Ethernet modem or a Wi-Fi module.

The external server may perform voice recognition by applying an ASR technology to a digital voice signal, and transmit a result of the voice recognition to the electronic apparatus 100.

As described above, the electronic apparatus 100 determines whether to perform processing after removing an audio signal output by a sensor device from among received audio signals and thus, may prevent unnecessary audio processing or overlapping processing from happening.

Hereinafter, the operations of the electronic apparatus 100 will be described in greater detail with reference to the corresponding drawings.

Figure 3:
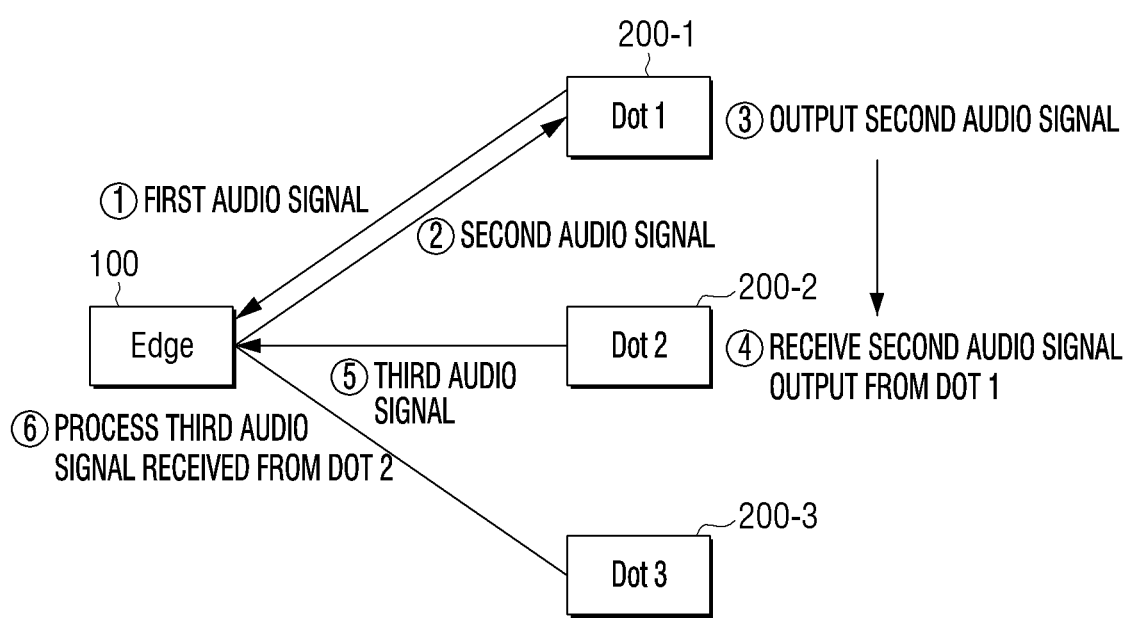

FIGS. 3 and 4 are views provided to explain the operations of the electronic apparatus 100 according to an embodiment.

As illustrated in FIG. 3, the electronic apparatus 100 (Edge) may perform communication with a first sensor 200-1 (Dot 1), a second sensor device 200-2 (Dot 2) and a third sensor device 200-3 (Dot 3).

Firstly, the first sensor device 200-1 may transmit a first audio signal to the electronic apparatus 100 according to a user voice. When receiving the first audio signal from the first sensor device 200-1, the processor 120 of the electronic apparatus 100 may perform an operation corresponding to the first audio signal, and control the first sensor device 200-1 to output a second audio signal indicating a result of performing the operation corresponding to the first audio signal. For example, the processor 120 may transmit the second audio signal and a control command to output the second audio signal to the first sensor device 200-1, and the first sensor device 200-1 may output the second audio signal according to the received control command.

The processor 120 may store the transmission time of the second audio signal and the second audio signal itself in the memory 130. When a threshold time elapses from the control time of the first sensor device 200-1, the processor 120 may delete the transmission time of the second audio signal and the second audio signal itself stored in the memory 130.

In this case, the second sensor device 200-2 that is adjacent to the first sensor device 200-1 may receive the second audio signal output by the first sensor device 200-1, but the third sensor device that is not adjacent to the first sensor device 200-1 may not receive the second audio signal output by the first sensor device 200-1. The second sensor device 200-2 may transmit a third audio signal to the electronic apparatus 100 based on the received second audio signal.

In this case, the third audio signal may be almost similar to the second audio signal. For example, if there is almost no ambient noise while the second audio signal is output, the third audio signal may be almost similar to the second audio signal. However, if there is an ambient noise while the second audio signal is output or there is a user's additional voice, the third audio signal may be considerably different from the second audio signal.

When the third audio signal is received, the processor 120 may compare the time when the third audio signal is received with the control time of the first sensor device 200-1. If the third audio signal is received within a threshold time from the control time of the first sensor device 200-1, the processor 120 may identify a similarity between the second audio signal and third audio signal. If the third audio signal is received after the threshold time from the control time of the first sensor device 200-1, the processor 120 may process the third audio signal.

If it is identified that the second audio signal and the third audio signal are similar, the processor 120 may not process the third audio signal. Alternatively, if it is determined that the second audio signal and the third audio signal are similar, the processor 120 may obtain a fourth audio signal where the second audio signal is removed from the third audio signal and process the fourth audio signal. If it is identified that the second audio signal and the third audio signal are not similar, the processor 120 may process the third audio signal.

As illustrated in FIG. 4, the memory 130 may store a history model including at least one of a time when a return audio signal is received or a probability that a return audio signal would be received. The time when a return audio signal is received or the probability that a return audio signal would be received may be obtained based on an operation history. In particular, the history model as described above may be obtained based on a rule or learned through an artificial intelligence algorithm. Hereinafter, the method of obtaining a history model based on a rule will be described and then, the method of using an artificial intelligence algorithm will be described.

The processor 120 may user the time of receiving a return audio signal stored in the memory 130 as a threshold time. For example, if the processor 120 receives the third audio signal from the third senor device 200-3 after controlling the first sensor device 200-1 to output the second audio signal, the processor 120 may identify whether the third audio signal is received within 1 second from the control time of the first sensor device 200-1. Alternatively, if the processor 120 receives the third audio signal from the second sensor device 200-2 after controlling the third audio sensor 200-3 to output the second audio signal, the processor 120 may identify whether the third audio signal is received within 0.15 seconds from the control time of the third sensor device 200-3.

The time of receiving a return audio signal may be obtained based on an operation history between sensor devices. For example, the processor may control one of a plurality of sensor devices to output an audio signal, and based on an audio signal similar to the output audio signal being received from another one of the plurality of sensor devices, may store a difference between the control time and the time of receiving the audio signal in the memory 130. The processor 120 may repeat such an operation and store the time difference with the highest reliability as the time of receiving the return audio signal. For example, the processor 120 may store the longest time difference as the time of receiving the return audio signal. Alternatively, the processor 120 may store the longest time difference from among a plurality of time differences satisfying a predetermined number of times or more as the time of receiving the return audio signal. For example, if a history including three times of 1 second time difference, two times of 0.2 second of time difference and one time of 1.5 second time difference is stored, the processor 120 may store 1 second time difference which is the longer time difference between 1 second time difference and 0.2 second time difference satisfying a predetermined number of two times or more as the time of receiving a return audio signal.

Meanwhile, the processor 120 may determine whether the second audio signal is included in the third audio signal based on the probability of receiving a return audio signal stored in the memory 130. Firstly, the prerequisite for using the probability of receiving a return audio signal is that the third audio signal is received within a threshold time from the time of controlling the sensor device to output the second audio signal, and the second audio signal is not similar to the third audio signal. In other words, when receiving the third audio signal from the second sensor device 200-2 within a threshold time after controlling the first sensor device 200-1 to output the second audio signal, the processor 120 may identify a similarity between the second audio signal and the third audio signal. Subsequently, if the processor 120 determines that the third audio signal is not similar to the second audio signal, the processor 120 may identify the probability of receiving a return audio signal of the first sensor device 200-1 and the second sensor device 200-2. If the identified probability of receiving a return audio signal is equal to or greater than a threshold value, the processor 120 may identify that the third audio signal includes the second audio signal, obtain the fourth audio signal where the second audio signal is removed from the third audio signal, and process the fourth audio signal.

The probability of receiving a return audio signal may be obtained based on an operation history between sensor devices. For example, the processor 120 may control one of a plurality of sensor devices to output an audio signal, and when an audio signal is received within a threshold time from another one of the plurality of sensor devices, identify a similarity between the output audio signal and the received audio signal and store the identified similarity in the memory 130. The memory 130 may accumulate and store the number of times when the audio signals are identified to be similar and when the audio signals are identified not to be similar. The processor 120 may obtain the probability of receiving a return audio signal based on the total number stored in the memory 130 and the number of times when the audio signals are identified to be similar.

Figure 5:
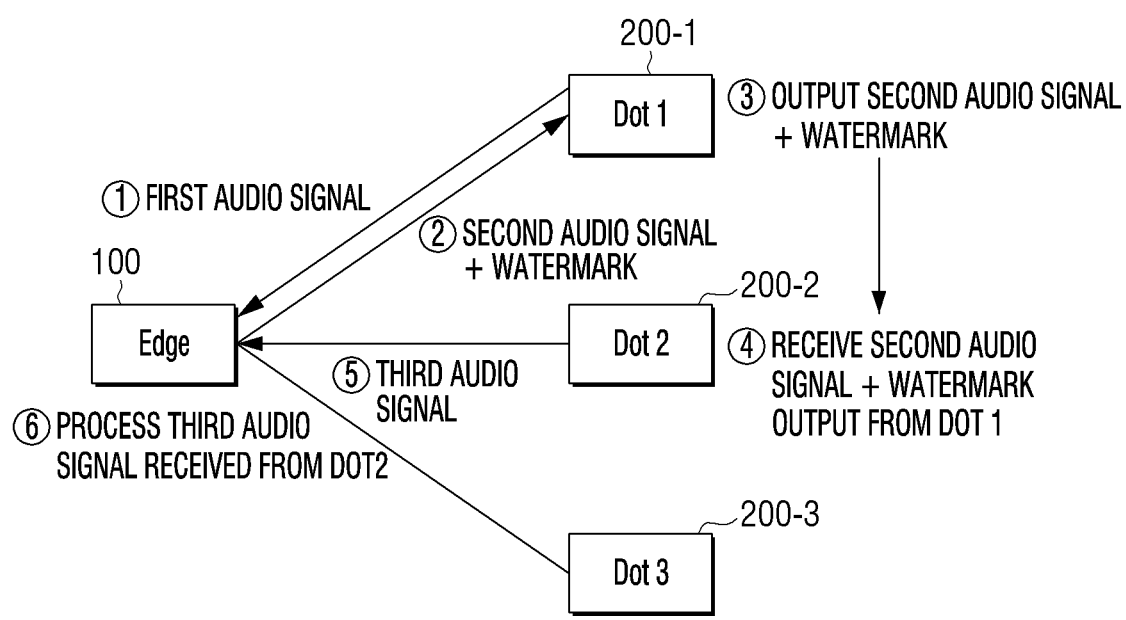
FIG. 5 is a view provided to explain an operation of an electronic apparatus according to another embodiment.

FIG. 5 is a view provided to explain an operation of the electronic apparatus 100 according to another embodiment.

As illustrated in FIG. 5, the electronic apparatus 100 (edge) may perform communication with the first sensor device 200-1 (Dot 1), the second sensor device 200-2 (Dot 2) and the third sensor device 200-3 (Dot 3).

Firstly, the first sensor device 200-1 may transmit a first audio signal to the electronic apparatus 100 according to a user voice. When the first audio signal is received from the first sensor device 200-1, the processor 120 of the electronic apparatus 100 may perform an operation corresponding to the first audio signal, and include a watermark in a second audio signal indicating a result of performing the operation corresponding to the first audio signal and transmit the second audio signal to the first sensor device 200-1. The first sensor device 200-1 may output the second audio signal including the watermark.

In this case, the second sensor device 200-2 that is adjacent to the first sensor device 200-1 may receive the second audio signal including the watermark output by the first sensor device 200-1, but the third sensor device 200-3 that is not adjacent to the first sensor device 200-1 may not receive the second audio signal including the watermark output by the first sensor device 200-1. The second sensor device 200-2 may transmit the third audio signal to the electronic apparatus 100 based on the received second audio signal including the watermark.

Here, the third audio signal may be almost similar to the second audio signal including the watermark. For example, if there is almost no ambient noise while the second audio signal including the watermark is output, the third audio signal may be almost similar to the second audio signal including the watermark. However, if there is an ambient noise while the second audio signal including the watermark is output or if the user utters an additional voice, the third audio signal may be considerably different from the second audio signal including the watermark.

The processor 120 may identify whether the received third audio signal includes a watermark. In other words, the processor 120 may identify only whether a watermark is included without considering a threshold time as illustrated in FIG. 3. However, the present disclosure is not limited thereto, and when the third audio signal is received, the processor 120 may compare the time when the third audio signal is received with the control time of the first sensor device 200-1, and when the third audio signal is received within a threshold time from the control time of the first sensor device 200-1, the processor 120 may identify whether the third audio signal includes a watermark.

If the third audio signal includes a watermark, the processor 120 may not process the third audio signal. Alternatively, if the third audio signal includes a watermark, the processor 120 may obtain the fourth audio signal where the second audio signal is removed from the third audio signal and process the fourth audio signal. If the third audio signal does not include a watermark, the processor 120 may process the third audio signal.

If the third audio signal includes a watermark, the processor 120 may identify a similarity between the second audio signal and the third audio signal. If it is identified that the third audio signal is similar to the second audio signal, the processor 120 may not process the third audio signal. Alternatively, if it is identified that the third audio signal is not similar to the second audio signal, the processor 120 may not processor 120 may obtain the fourth audio signal where the second audio signal is removed from the third audio signal and process the fourth audio signal.

In other words, if a watermark is used as illustrated in FIG. 5, there is no need to use the probability of receiving a return audio signal.

Figure 6:
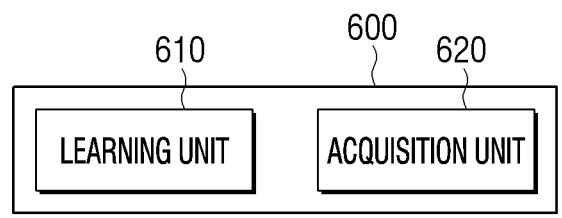
FIG. 6 is a block diagram illustrating configuration of another electronic apparatus according to an embodiment.

FIG. 6 is a block diagram illustrating configuration of another electronic apparatus 600 according to an embodiment. Here, another electronic apparatus 600 may be an apparatus that generates a history model through an artificial intelligence algorithm.

Referring to FIG. 6, another electronic apparatus 600 may include at least one of a learning unit 610 or an acquisition unit 620.

The learning unit 610 may generate or train a history model using an audio signal transmitted to one of a plurality of sensor devices and an audio signal received from another one of the plurality of sensor devices. The learning unit 610 may generate a history model using the transmitted audio signal and the received audio signal.

The acquisition unit 620 may obtain the time when a return audio signal is received and the probability of receiving a return audio signal using predetermined data as input data of a trained artificial intelligence model.

For example, the acquisition unit 620 may obtain the time when a return audio signal is received based on the time when an audio signal is transmitted, the time when the audio signal is received and a similarity between the transmitted audio signal and the received audio signal.

According to an embodiment, the learning unit 610 and the acquisition unit 620 may be included in another electronic apparatus 600, but this is only an example. The learning unit 610 and the acquisition unit 620 may be mounted inside the electronic apparatus 100. Specifically, at least part of the learning unit 610 and at least part of the acquisition unit 620 may be implemented as a software module, manufactured in the form of a hardware chip and mounted on the electronic apparatus 100. For example, at least one of the learning unit 610 or the acquisition unit 620 may be manufactured in the form of a dedicated hardware chip for an artificial intelligence (AI), or may be manufactured as part of the existing general-purpose processor (e.g., a CPU or an application processor) or a graphic-only processor (e.g., a GPU) and mounted on various electronic apparatuses described above. In this case, the dedicated hardware chip for artificial intelligence is a dedicated processor specialized in probability calculation, and may process operational tasks in the field of artificial intelligence such as machine learning rapidly as it has higher parallel processing performance than the existing general-purpose processor. If the learning unit 610 and the acquisition unit 620 are implemented as a software module (or a program module including instructions), the software module may be stored in a non-transitory computer readable media that is readable by a computer. In this case, the software module may be provided by an Operating System (OS) or a predetermined application. Alternatively, some of the software modules may be provided by an OS and the other may be provided by a predetermined application.

In this case, the learning unit 610 and the acquisition unit 620 may be mounted on one electronic apparatus, or may be mounted in separate electronic apparatuses, respectively. For example, one of the learning unit 610 or the acquisition unit 620 may be included in one electronic apparatus 100 and the other one may be included in another electronic apparatus 600. In addition, the learning unit 610 and the acquisition unit 620 may provide model information built by the learning unit 610 to the acquisition unit 620 through wire or wirelessly, or data input to the acquisition unit 620 may be provided to the learning unit 610 as additional learning data.

Figure 7:
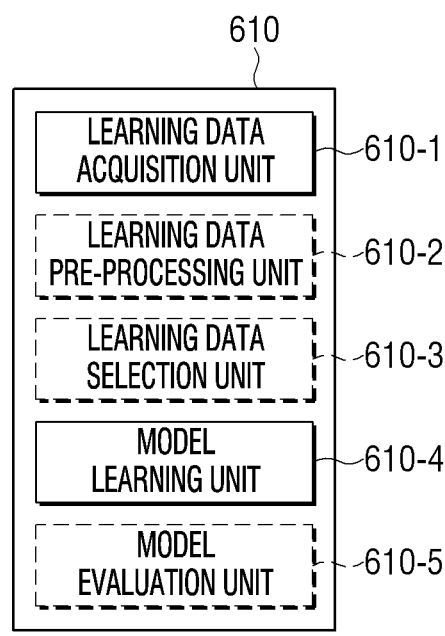
FIG. 7 is a block diagram illustrating a learning unit according to an embodiment.

FIG. 7 is a block diagram illustrating the learning unit 610 according to an embodiment.

Referring to FIG. 7, the learning unit 610 according to an embodiment may include a learning data acquisition unit 610-1, a model learning unit 610-4. In addition, the learning unit 610 may selectively further include at least one of a learning data pre-processing unit 610-2, a learning data selection unit 610-3 or a model evaluation unit 610-5.

The learning data acquisition unit 610-1 may obtain learning data required for an artificial intelligence model. According to an embodiment, the learning data acquisition unit 610-1 may obtain the audio signals transmitted and received by the electronic apparatus 100 as learning data. The learning data may be data collected or tested by the learning unit 610 or a manufacturer of the learning unit 610.

The model learning unit 610-4 may train an artificial intelligence model regarding the time when a return audio signal is received and the probability of receiving a return audio signal using the learning data. In particular, the model learning unit 610-4 may train an artificial intelligence model through a history model based on the similarity between the transmitted audio signal and the received audio signal. For example, the model learning unit 610-4 may train an artificial intelligence model through supervised learning that uses at least part of the learning data as a criterion for determination. Alternatively, the model learning unit 610-4 may train an artificial intelligence model through unsupervised learning with minimum noises by learning by itself using learning data without any particular supervision. The model learning unit 610-4 may, for example, train an artificial intelligence model through reinforcement learning that uses a feedback on whether a result of providing a response according to learning is correct. In addition, the model learning unit 610-4 may train an artificial intelligence model using a learning algorithm including, for example, error back-propagation or gradient descent.

In addition, the model learning unit 610-4 may learn selection criteria for which learning data to use in order to obtain data with guaranteed accuracy by using input data.

If there are a plurality of pre-established artificial intelligence models, the model learning unit 610-4 may determine an artificial intelligence with greater relevance to input learning data and basic learning data as an artificial intelligence model to be trained. In this case, the basic learning data may be pre-classified for each data type, and the artificial intelligence models may be pre-established for each data type.

Once an artificial intelligence model is trained, the model learning unit 610-4 may store the trained artificial intelligence model. In this case, the model learning unit 610-4 may store the trained artificial intelligence model in a memory of another electronic apparatus 600. Alternatively, the model learning unit 610-4 may store the trained artificial intelligence model in a server or a memory of an electronic apparatus connected to another electronic apparatus 600 via wire or wirelessly.

The learning unit 610 may further include a data pre-processor 610-2 and a learning data selection unit 610-3 in order to improve a response result of an artificial intelligence model or save resources or time required for generating an artificial intelligence model.

The learning data pre-processor 610-2 may pre-process the obtained data. In other words, the learning data pre-processor 610-2 may process the obtained data in a predetermined format. For example, the learning data pre-processor 610-2 may remove a case where a similarity is low or a case where an audio signal is received after a threshold time.

The learning data selection unit 610-3 may select data required for learning among data obtained by the learning data acquisition unit 610-1 or data pre-processed by the learning data pre-processor 610-2. The selected learning data may be provided to the model learning unit 610-4. The learning data selection unit 610-3 may select learning data required for learning among the obtained or pre-processed data according to predetermined selection criteria. In addition, the learning data selection unit 610-3 may select learning data according to selection criteria predetermined by learning of the model learning unit 610-4.

The learning unit 610 may further include the model evaluation unit 610-5 in order to improve a response result of an artificial intelligence model.

The model evaluation unit 610-5 may input evaluation data to an artificial intelligence model, and if a response result output from the evaluation data does not satisfy a predetermined criterion, may train the model learning unit 610-4 again. In this case, the evaluation data may be pre-defined data to evaluate an artificial intelligence model.

Meanwhile, if there are a plurality of trained artificial intelligence models, the model evaluation unit 610-5 may evaluate whether each of the trained artificial intelligence models satisfies a predetermined criterion, and determine a model that satisfies the predetermined criterion as a final artificial intelligence model. In this case, if there are a plurality of models that satisfy the predetermined criterion, the model evaluation unit 610-5 may determine a predetermined one model or the predetermined number of models in order of highest evaluation score as the final artificial intelligence model(s).

Figure 8:
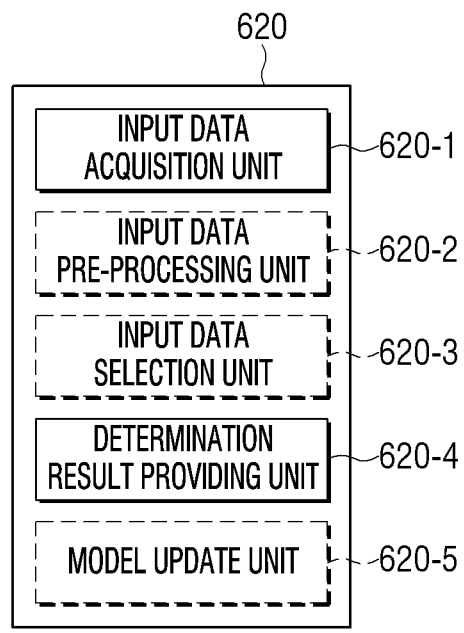
FIG. 8 is a block diagram illustrating an acquisition unit according to an embodiment.

FIG. 8 is a block diagram illustrating the acquisition unit 620 according to an embodiment.

Referring to FIG. 8, the acquisition unit 620 according to an embodiment may include an input data acquisition unit 620-1 and a response result provider 620-4.

In addition, the acquisition unit 620 may selectively further include at least one of an input data pre-processor 620-2, an input data selection unit 620-3 or a model update unit 620-5.

The input data acquisition unit 620-1 may obtain audio signals transmitted and received by the electronic apparatus 100. The response result provider 620-4 may obtain the time when a return audio signal is received an the probability of receiving a return audio signal by applying input data obtained by the input data acquisition unit 620-1 to a trained artificial intelligence model as an input value. The response result provider 620-4 may obtain a response result by applying data selected by the input data pre-processor 620-2 or the input data selection unit 620-3 which will be described later to an artificial intelligence model as an input value. The response result may be determined by the artificial intelligence model.

The acquisition unit 620 may further include the input data pre-processor 620-2 and the input data selection unit 620-3 in order to improve the response result of the artificial intelligence model or to save resources or time for providing the response result.

The input data pre-processor 620-2 may pre-process obtained data. In other words, the input data pre-processor 620-2 may process data obtained by the response result provider 620-4 in a predetermined format.

The input data selection unit 620-3 may select data necessary for providing a response from data obtained by the input data acquisition unit 620-1 and data pre-processed by the input data pre-processor 620-2. The selected data may be provided to the response result provider 620-4. The input data selection unit 620-3 may select part or all of the obtained or pre-processed data according to predetermined criteria for providing a response. In addition, the input data selection unit 620-3 may select data according to predetermined criteria by learning by the model learning unit 610-4.

The model update unit 620-5 may control to update an artificial intelligence model based on evaluation on a response result provided by the response result provider 620-4. For example, the model update unit 620-5 may request the model learning unit 610-4 to further train or update an artificial intelligence model by providing a response result provided by the response result provider 620-4 to the model learning unit 610-4.

Figure 9:
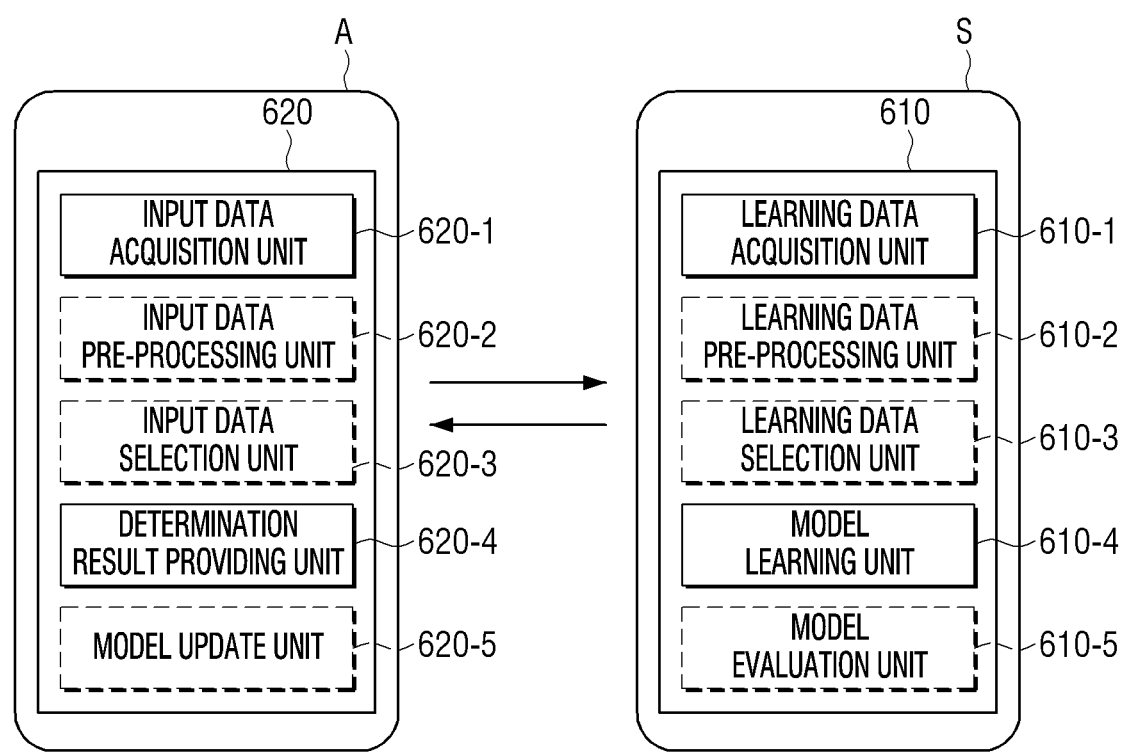
FIG. 9 is a view illustrating an example in which an electronic apparatus and an external server learn and determine data in association with each other according to an embodiment.

FIG. 9 is a view illustrating an example in which the electronic apparatus 100 according to an embodiment and an external server (S) learn and identify data in association with each other.

Referring to FIG. 9, the external server (S) may learn criteria for learning a history model including at least one of the time when a return audio signal is received or the probability of receiving a return audio signal based on audio signals transmitted and received by the electronic apparatus 100, and the electronic apparatus 100 may obtain a history model based on the learning result by the server (S).

In this case, the model learning unit 610-4 of the server (S) may perform the function of the learning unit 610 illustrated in FIG. 7. In other words, the model learning unit 610-4 of the server (S) may learn criteria regarding which information to use in order to obtain learning data and how to determine the time when a return audio signal is received or the probability of receiving a return audio signal using the above information.

In addition, the response result provider 620-4 of the electronic apparatus 100 may identify whether to process the received audio signal by applying data selected by the input data selection unit 620-3 to an artificial intelligence model generated by the server (S). Alternatively, the response result provider 620-4 of the electronic apparatus 100 may receive an artificial intelligence model generated by the server (S) and identify whether to process the received audio signal using the received artificial intelligence model.

FIG. 10 is a flowchart provided to explain a controlling method of an electronic apparatus according to an embodiment.

Firstly, when the first audio signal is received from the first sensor device from among a plurality of sensor devices, an operation corresponding to the first audio signal is performed (S1010). The first sensor device is controlled to output the second audio signal indicating the result of performing the operation corresponding to the first audio signal (S1020). When the third audio signal is received from the second sensor device from among the plurality of sensor devices within a threshold time from the control time of the first sensor, whether to process the third audio signal is determined based on the second audio signal and the third audio signal (S1030).

Here, the step of determining (S1030) may include obtaining a similarity between the second audio signal and the third audio signal and when the similarity is equal to or greater than a threshold value, not processing the third audio signal.

In addition, the step of determining (S1030) may further include processing the fourth audio signal where the second audio signal is removed from the third audio signal or processing the third audio signal based on the operation history of the first sensor device and the second sensor device stored in a memory of the electronic apparatus.

Here, the operation history may include information regarding at least one of a similarity between the audio signal transmitted to one of the plurality of sensor devices and the audio signal received from another one of the plurality of sensor devices or a time difference between the control time of one of the plurality of sensor devices and the time when an audio signal is received from another one of the plurality of sensor devices.

Meanwhile, the step of controlling (S1020) may include controlling the first sensor device to output the second audio signal and a watermark, and the step of determining (S1030) may include, when the third audio signal includes a watermark, not processing the third audio signal.

Here, the step of controlling (S1020) may include controlling the first sensor device to output the watermark as at least one of low frequency, high frequency or inaudible sound.

Meanwhile, the step of obtaining a threshold time based on the operation history of the first sensor device and the second sensor device stored in a memory of the electronic apparatus may be further included.

Here, the threshold time may be updated based on at least one of the signal intensity of the first audio signal or the signal intensity of the third audio signal.

Meanwhile, the step of determining (S1030) may include determining whether to perform voice recognition regarding the third audio signal based on the second audio signal and the third audio signal.

In addition, the step of determining (S1030) may include, when the third audio signal is received after the threshold time from the control time of the first sensor device, processing the third audio signal.

According to the above-described various embodiments, the electronic apparatus may determine whether to process after removing the audio signal output by the sensor device from among the received audio signals and thus, may prevent the problem of unnecessary audio processing and overlapping processing.

Meanwhile, the methods according to the above-described various embodiments may be implemented in the form of an application that is installable in the existing electronic apparatuses.

In addition, the methods according to the above-described various embodiments may be implemented only by software upgrade or hardware upgrade regarding the existing electronic apparatuses.

In addition, the above-described various embodiments may be performed through an embedded server of the electronic apparatus, or an external server of at least one of the electronic apparatus or the display apparatus.

Meanwhile, the above-described various embodiments may be implemented as software including instructions stored in a storage medium which can be read by machine (e.g., a computer). The machine may call instructions from the storage medium and perform operations according to the instructions, and may include an electronic apparatus (e.g., an electronic apparatus (A)). When an instruction is executed under the control of the processor, the processor directly or using other components under the control of the processor may perform a function corresponding to the instruction. The instructions may include a code generated or executed by a complier or an interpreter. The storage medium which can be read by machine may be provided in the form of a non-transitory storage medium. Here, 'non-transitory' merely means that the storage medium is a tangible device and does not include a signal, and this term is not used to distinguish a case where data is stored in the storage medium semi-permanently and a case where data is stored temporarily.

According to an embodiment, a method according to the various embodiments may be included in a computer program product and provided therein. The computer program product can be traded between a seller and a buyer as a product. The computer program product may be distributed in the form of a storage medium that can be read by machine (e.g., compact disc read only memory (CD-ROM)), or may be distributed online through an application store (e.g., PlayStore™). In the case of online distribution, at least a portion of the computer program product may be at least temporarily stored in a storage medium such as a memory of a server of a manufacturer, a server of an application store, or a relay server, or may be temporarily generated.

Each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
    a communication interface; and
    a processor configured to:
    based on receiving a first audio signal from a first sensor device from among a plurality of sensor devices through the communication interface, perform an operation corresponding to the first audio signal;
    control the first sensor device to output a second audio signal indicating a result of performing the operation corresponding to the first audio signal; and
    based on receiving a third audio signal from a second sensor device from among the plurality of sensor devices within a threshold time from a time of controlling the first sensor device through the communication interface, determine whether to process the third audio signal based on the second audio signal and the third audio signal.

2. The apparatus as claimed in claim 1, wherein the processor obtains a similarity between the second audio signal and the third audio signal, and based on the similarity being equal to or greater than a threshold value, does not process the third audio signal.

3. The apparatus as claimed in claim 2, further comprising:
    a memory,
    wherein the processor is configured to, based on the similarity being less than the threshold value, process a fourth audio signal where the second audio signal is removed from the third audio signal or process the third audio signal based on an operation history of the first sensor device and the second sensor device stored in the memory.

4. The apparatus as claimed in claim 3, wherein the operation history includes at least one of information on a similarity between an audio signal transmitted to one of the plurality of sensor devices and an audio signal received from another one of the plurality of sensor devices or a time difference between a control time of one of the plurality of sensor devices and a time of receiving an audio signal from another one of the plurality of sensor devices.

5. The apparatus as claimed in claim 1, wherein the processor controls the first sensor device to output the second audio signal and a watermark, and based on the third audio signal including the watermark, does not process the third audio signal.

6. The apparatus as claimed in claim 5, wherein the processor is configured to control the first sensor device to output as at least one of low frequency, high frequency or inaudible sound.

7. The apparatus as claimed in claim 1, further comprising:
    a memory,
    wherein the processor is configured to obtain the threshold time based on an operation history of the first sensor device and the second sensor device stored in the memory.

8. The apparatus as claimed in claim 7, wherein the processor is configured to update the threshold time based on at least one of a signal intensity of the first audio signal or a signal intensity of the third audio signal.

9. The apparatus as claimed in claim 1, wherein the processor is configured to determine whether to perform voice recognition of the third audio signal based on the second audio signal and the third audio signal.

10. The apparatus as claimed in claim 1, wherein the processor is configured to, based on receiving the third audio signal after the threshold time from the control time of the first sensor device through the communication interface, process the third audio signal.

11. A controlling method of an electronic apparatus, the method comprising:
    based on receiving a first audio signal from a first sensor device from among a plurality of sensor devices, performing an operation corresponding to the first audio signal;
    controlling the first sensor device to output a second audio signal indicating a result of performing the operation corresponding to the first audio signal; and
    based on receiving a third audio signal from a second sensor device from among the plurality of sensor devices within a threshold time from a time of controlling the first sensor device, determining whether to process the third audio signal based on the second audio signal and the third audio signal.

12. The method as claimed in claim 11, wherein the determining comprises obtaining a similarity between the second audio signal and the third audio signal, and based on the similarity being equal to or greater than a threshold value, not processing the third audio signal.

13. The method as claimed in claim 12, wherein the determining comprises, based on the similarity being less than the threshold value, processing a fourth audio signal where the second audio signal is removed from the third audio signal or processing the third audio signal based on an operation history of the first sensor device and the second sensor device stored in the electronic apparatus.

14. The method as claimed in claim 13, wherein the operation history includes at least one of information on a similarity between an audio signal transmitted to one of the plurality of sensor devices and an audio signal received from another one of the plurality of sensor devices or a time difference between a control time of one of the plurality of sensor devices and a time of receiving an audio signal from another one of the plurality of sensor devices.

15. The method as claimed in claim 11, wherein the controlling comprises controlling the first sensor device to output the second audio signal and a watermark; and wherein the determining comprises, based on the third audio signal including the watermark, not processing the third audio signal.

* * * * *